US009359705B2

(12) United States Patent
Nishimura et al.

(10) Patent No.: US 9,359,705 B2
(45) Date of Patent: Jun. 7, 2016

(54) WASHING MACHINE AND DRYING MACHINE

(71) Applicants: KABUSHIKI KAISHA TOSHIBA, Tokyo (JP); TOSHIBA CONSUMER ELECTRONICS HOLDINGS CORPORATION, Tokyo (JP); TOSHIBA HOME APPLIANCES CORPORATION, Tokyo (JP)

(72) Inventors: Takashi Nishimura, Tokyo (JP); Hiroshi Nishimura, Tokyo (JP); Koji Hisano, Tokyo (JP); Tatsuya Ooyabu, Tokyo (JP); Shinichiro Kawabata, Tokyo (JP)

(73) Assignees: KABUSHIKI KAISHA TOSHIBA, Tokyo (JP); TOSHIBA CONSUMER ELECTRONICS HOLDINGS CORPORATION, Tokyo (JP); TOSHIBA HOME APPLIANCES CORPORATION, Tokyo (JP)

( * ) Notice: Subject to any disclaimer, the term of this patent is extended or adjusted under 35 U.S.C. 154(b) by 856 days.

(21) Appl. No.: 13/660,696

(22) Filed: Oct. 25, 2012

(65) Prior Publication Data
US 2013/0042492 A1 Feb. 21, 2013

Related U.S. Application Data

(63) Continuation of application No. PCT/JP2010/072241, filed on Dec. 10, 2010.

(30) Foreign Application Priority Data

Apr. 26, 2010 (JP) .................................. 2010-100837

(51) Int. Cl.
*D06F 37/20* (2006.01)
*D06F 37/22* (2006.01)
(Continued)

(52) U.S. Cl.
CPC ............... *D06F 37/20* (2013.01); *D06F 33/02* (2013.01); *D06F 35/007* (2013.01); *D06F 37/22* (2013.01);
(Continued)

(58) Field of Classification Search
CPC ......... D06F 33/02; D06F 37/20; D06F 37/22; D06F 35/007; F16F 9/535
See application file for complete search history.

(56) References Cited

U.S. PATENT DOCUMENTS

| 5,284,330 A | 2/1994 | Carlson |
| 5,398,917 A | 3/1995 | Carlson |

(Continued)

FOREIGN PATENT DOCUMENTS

| CN | 101319452 | 12/2008 |
| CN | 101709761 | 5/2010 |

(Continued)

OTHER PUBLICATIONS

U.S. Appl. No. 13/593,206.
(Continued)

*Primary Examiner* — Joseph L Perrin
(74) *Attorney, Agent, or Firm* — DLA Piper LLP (US)

(57) ABSTRACT

A washing machine includes a vibration damping device located in an outer casing for damping vibration of a tub using a cylinder enclosing an operating fluid including a functional fluid such as a magnetic viscous fluid changing a viscosity when an electrical energy is applied to the fluid. The vibration damping device includes the cylinder, a shaft inserted into the cylinder, a coil disposed in the cylinder, two yokes disposed between the cylinder and the shaft so as to be located at both axial sides of the coil respectively, the yokes forming a magnetic circuit together with the shaft and cylinder, a sealing member disposed axially outside one of the yokes in the cylinder to seal the operating fluid, and two bearings located axially outside the respective yokes in the cylinder to support the shaft so that the shaft is axially reciprocable.

5 Claims, 8 Drawing Sheets

(51) Int. Cl.
*D06F 33/02* (2006.01)
*F16F 9/53* (2006.01)
*D06F 35/00* (2006.01)

(52) U.S. Cl.
CPC ............. *F16F 9/535* (2013.01); *D06F 2202/04* (2013.01); *D06F 2202/065* (2013.01); *D06F 2204/10* (2013.01)

(56) References Cited

U.S. PATENT DOCUMENTS

| | | | |
|---|---|---|---|
| 5,492,312 | A | 2/1996 | Carlson |
| 5,907,880 | A * | 6/1999 | Durazzani ............... F16F 9/535 188/267 |
| 6,151,930 | A | 11/2000 | Carlson |
| 6,202,806 | B1 | 3/2001 | Sandrin |
| 6,340,080 | B1 | 1/2002 | Carslon |
| 6,390,253 | B1 | 5/2002 | Oliver |
| 6,394,239 | B1 | 5/2002 | Carlson |
| 6,471,018 | B1 | 10/2002 | Gordaninejad |
| 6,497,309 | B1 | 12/2002 | Lisenker |
| 6,823,971 | B2 | 11/2004 | Takeda |
| 6,883,649 | B2 | 4/2005 | Lun |
| 6,974,000 | B2 * | 12/2005 | Carlson ................... F16F 9/535 188/171 |
| 7,219,781 | B2 | 5/2007 | Akami |
| 8,387,420 | B2 | 3/2013 | Kawabata |
| 2002/0130002 | A1 | 9/2002 | Hopkins |
| 2002/0185347 | A1 | 12/2002 | Pohl |
| 2003/0233854 | A1 | 12/2003 | Matsuda |
| 2004/0195062 | A1 * | 10/2004 | Anderfaas ............... F16F 9/535 188/267.2 |
| 2004/0262106 | A1 | 12/2004 | Manecke |
| 2005/0211517 | A1 * | 9/2005 | Carlson ................... D06F 37/20 188/267 |
| 2007/0023244 | A1 * | 2/2007 | Carlson ................... A47C 1/03 188/267 |
| 2008/0007012 | A1 | 1/2008 | Jeong |
| 2009/0050425 | A1 | 2/2009 | Murakami |

FOREIGN PATENT DOCUMENTS

| | | |
|---|---|---|
| EP | 2072653 | 6/2009 |
| JP | 63-125243 | 8/1988 |
| JP | 8-19687 | 1/1996 |
| JP | 8-21482 | 1/1996 |
| JP | 10-214715 | 8/1998 |
| JP | 2002-502942 | 1/2002 |
| JP | 2005-502850 | 1/2005 |
| JP | 2006-029585 | 2/2006 |
| JP | 2006-57766 | 3/2006 |
| JP | 2006-230591 | 9/2006 |
| JP | 2007-115835 | 5/2007 |
| JP | 2008-20065 | 1/2008 |
| JP | 2008-208885 | 9/2008 |
| JP | 2008-295906 | 12/2008 |
| JP | 2009-095532 | 5/2009 |
| WO | WO 99/22162 | 5/1999 |
| WO | WO 2010/092886 | 2/2010 |

OTHER PUBLICATIONS

U.S. Appl. No. 13/681,566.
Korean Office Action issued in KR 10-2012-7028098 on Dec. 12, 2013.
English Language Translation of Korean Office Action issued in KR 10-2012-7028098 on Dec. 12, 2013.
International Search Report in PCT/JP2010/072240 issued Mar. 8, 2011.
Japanese Office Action issued in JP 2010-186109 mailed May 8, 2012.
English Language Translation of Japanese Office Action issued in JP 2010-186109 mailed May 8, 2012.
English Language Abstract of JP 08-021482 published Jan. 23, 1996.
English Language Translation of JP 08-021482 published Jan. 23, 1996.
English Language Abstract of JP 2006-057766 published Mar. 2, 2006.
English Language Translation of JP 2006-057766 published Mar. 2, 2006.
English Language Abstract of JP 2007-115835 published on May 10, 2007.
English Language Translation of JP 2007-115835 published on May 10, 2007.
English Language Abstract of JP 2008-020065 published Jan. 31, 2008.
English Language Translation of JP 2008-020065 published Jan. 31, 2008.
English Language Abstract of JP 2008-295906 published Dec. 11, 2008.
English Language Translation of JP 2008-295906 published Dec. 11, 2008.
English Language Abstract of JP 2002-502942 published Jan. 29, 2002.
English Language Translation of JP 2002-502942 published Jan. 29, 2002.
English Language Abstract of JP 8-019687 published Jan. 23, 1996.
English Language Translation of JP 8-019687 published Jan. 23, 1996.
International Search Report issued in PCT/JP2010/072241 on Apr. 5, 2011.
English Language Abstract of JP 2009-095532 published May 7, 2009.
English Language Translation of JP 2009-095532 published May 7, 2009.
International Search Report issued in PCT/JP2011/050539 on Mar. 8, 2011.
English Language Abstract of JP 2005-502850 published Jan. 27, 2005.
English Language Translation of JP 2005-502850 published Jan. 27, 2005.
English Language Abstract of JP 63-125243 published Aug. 16, 1988.
Korean Office Action issued in KR 2012-7030456 on Dec. 26, 2013.
English Language Translation of Korean Office Action issued in KR 2012-7030456 on Dec. 26, 2013.
Chinese Office Action issued in CN 201080066452.X on Mar. 9, 2015 with Translation.
English Language Abstract of CN 101709761 published May 19, 2010.
English Language Abstract of JP 10-214715 published Aug. 11, 1998.
English Language Translation of JP 10-214715 published Aug. 11, 1998.
English Language Abstract of JP 2008-208885 published Sep. 11, 2008.
English Language Translation of JP 2008-208885 published Sep. 11, 2008.
Japanese Office Action issued in JP 2010-038631 dated May 21, 2013.
English Language Translation of Japanese Office Action issued in JP 2010-038631 dated May 21, 2013.
Extended European Search Report issued in EP 10846640.0 on Jul. 3, 2013.
Extended European Search Report issued in EP 10850762.5 on Sep. 20, 2013.
Korean Office Action issued in KR10-2012-7016693 issued on Sep. 24, 2013.
English Language Translation of Korean Office Action issued in KR10-2012-7016693 issued on Sep. 24, 2013.
Initial Examination Report issued in TW 100101708 on Oct. 17, 2013.
English Language Translation of Initial Examination Report issued in TW 100101708 on Oct. 17, 2013.

(56) References Cited

OTHER PUBLICATIONS

English Language Abstract and Translation of JP 2006-230591 published on Sep. 7, 2006.

English Language Abstract and Translation of JP2006-029585 published on Feb. 2, 2006.

Chinese Office Action issued in CN 201080066452X dated Jul. 18, 2014 with English Language Translation.

English Language Abstract for CN 101319452 published Dec. 10, 2008.

* cited by examiner

| ENERGIZATION TO COIL | NON-ENERGIZED | SMALL CURRENT | MIDDLE CURRENT | LARGE CURRENT |
|---|---|---|---|---|
| CURRENT VALUE I | 0(I0) | I1<I2 | I3<I4 | I5 |
| DAMPING FORCE F | F0 | F1<F2 | F3<F4 | F5 |

WASHING MACHINE AND DRYING MACHINE

CROSS-REFERENCE TO RELATED APPLICATIONS

This application is based upon and claims the benefit of priority from the prior Japanese Patent Application No. 2010-100837 filed on Apr. 26, 2010 and International Application No. PCT/JP2010/072241 filed on Dec. 10, 2010, the entire contents of both of which are incorporated herein by reference.

FIELD

Embodiments described herein relate to a washing machine and a drying machine.

BACKGROUND

There has conventionally been provided a washing machine including dampers which support a water tub mounted in an outer casing between the outer casing and the water tub thereby to absorb vibration of a rotating tub (an inner tub) and accordingly, vibration of the water tub. This type of damper employs as an operating fluid a magnetic viscous fluid (MR fluid) changing its viscosity according to the intensity of magnetic field.

The damper includes a cylindrical member (a cylinder) enclosing the magnetic viscous fluid and electromagnets disposed around the cylindrical member. The viscosity characteristics of the magnetic viscous fluid are changed by controlling electric current applied to the electromagnets by a controller. The water tub is provided with a sensor serving as a vibration detection unit. The current to be applied to the electromagnets is controlled on the basis of a detection signal generated by the sensor, so that a damping force is changed.

In the above-described washing machine, however, the control of the damper is not started unless an increase in vibration is detected by the sensor. More specifically, the control of the damper premises the detection of vibration by the sensor and is thus an ex-post operation. Accordingly, an effect of suppressing vibration and noise is insufficient and in particular, a large vibration is produced during a dehydrating operation.

DETAILED DESCRIPTION

Figure 1:
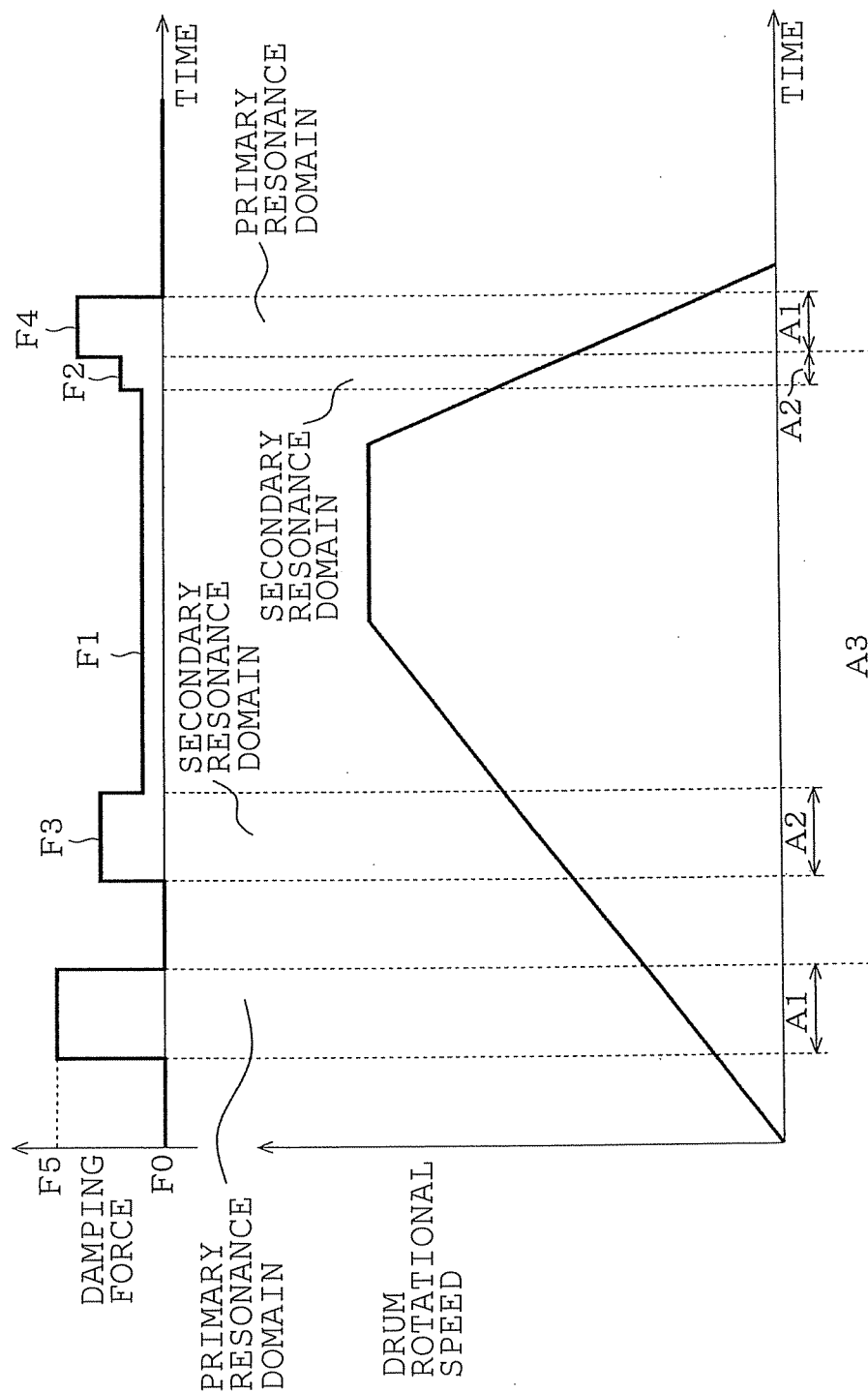
FIG. 1 is a diagram showing the relationship between rotation of the rotating tub and a damping force of the vibration damping device in a washing machine according to a first embodiment.

In general, according to one embodiment, a washing machine includes an outer casing, a tub mounted in the outer casing, a rotating tub rotatably mounted in the tub, a vibration damping device provided in the outer casing for damping vibration of the tub using a cylinder enclosing an operating fluid including a functional fluid further including a magnetic viscous fluid which changes a viscosity when an electric energy is applied thereto, and a control unit which is configured to control a viscosity of the functional fluid. The vibration damping device includes the cylinder, a shaft inserted in to the cylinder, a coil disposed in the cylinder so as to extend through the shaft and two yokes. The yokes are disposed between the cylinder and the shaft so as to be located at both axial sides of the coil in the cylinder respectively. The yokes form a magnetic circuit together with the shaft and the cylinder. The shaft and the coil define a first gap. One of the yokes and the shaft define a second gap. The other yoke and the shaft define a third gap. All the gaps are filled with the magnetic viscous fluid. The vibration damping device further includes a sealing member disposed axially outside one of the yokes in the cylinder to seal the functionally fluid thereby to prevent the functional fluid from leaking and two bearings located axially outside the respective yokes in the cylinder to support the shaft so that the shaft is axially reciprocable relative to the yokes, the bearings and the sealing member. In the washing machine, the control unit is configured to execute an energization control of the coil, in which control the viscosity of the functional fluid is changed according to the rotation of the rotating tub in a dehydration step, thereby varying a damping force of the vibration damping device.

Several embodiments of the washing machine and the drying machine will be described with reference to the accompanying drawings. Identical or similar parts or components will be affixed with the same reference symbols throughout the embodiments and duplicate description of such parts or components will be eliminated.

First Embodiment:

A first embodiment will be described with reference to FIGS. 1 to 7B. Referring to FIG. 2, a drum type washing machine (hereinafter, "washing machine") 10 includes an outer casing 11 which serves as an outer shell and has a front (located at the right side in FIG. 2) formed with a substantially centrally located access opening 12 and a door 13 opening and closing the access opening 12. An operation panel 14 is mounted on an upper part of the front of the outer casing 11. A control device 15 which controls an operation of the washing machine is provided on a reverse (inside the outer casing 11) of the operation panel 14. The outer casing 11 includes a bottom plate 11a on which is mounted a temperature detection unit (a temperature detector 67; and see FIG. 4) which detects a temperature inside the outer casing 11.

A substantially horizontal axis cylindrical water tub 16 is mounted in the outer casing 11. The water tub 16 has a central axis directed in a front-back direction (in a right-left direction as viewed in FIG. 2) and is elastically supported on the bottom plate 11a by a pair of right and left suspensions 17 (only one being shown in FIG. 2) so as to be inclined frontwardly upward. A concrete construction of one of the suspensions 17 will be described in detail later.

An electric motor 18 such as a brushless DC motor is mounted on a rear of the water tub 16. The motor 18 includes a rotor 18a having a rotating shaft (not shown) extending through a central part of the rotor 18a. The rotating shaft is inserted through a bearing bracket 19 into an interior of the water tub 16.

A horizontal axis cylindrical drum 20 is mounted in the water tub 16. The drum 20 has a central rear part which is fixed to a distal end of the rotating shaft of the motor 18 thereby to be supported in an inclined state so as to be coaxial with the water tub 16. As a result, the drum 20 is configured to be rotated by the motor 18 thereby to serve as a rotating tub. Thus, the motor 18 functions as a drum driving device to rotate the drum 20. The drum 20 has a number of small holes 21 formed over an entire outer circumference thereof or a torso. The drum 20 and the water tub 16 have fronts formed with openings 22 and 23 respectively. The opening 23 of the water tub 16 communicates with the access opening 12 through annular bellows 24. As a result, the access opening 12 communicates with an interior of the drum 20 through the bellows 24, the opening 23 of the water tub 16 and the opening 22 of the drum 20.

A draining conduit 26 is connected via a drain valve 25 to a rear bottom of the water tub 16. A drying device 27 is disposed so as to extend from the rear of the water tub 16 to the upper part and the front of the water tub 16. The drying device 27 includes a dehumidifier 28, a blower 29 and a heater 30. The drying device 27 dehumidifies and heats air in the water tub 16 and returns the air into the water tub 16, whereby air is circulated so that laundry is dried.

The structure of the suspension 17 will be described in detail with reference to FIG. 3 as well as FIGS. 1 and 2. The suspension 17 includes a damper 31 serving as a damping device which damps vibration of the water tub 16.

More specifically, the damper 31 includes a cylinder 32 as a primary member and a shaft 33. The cylinder 32 has an upper end formed with a connecting portion 34 which is inserted through a mounting plate 35 (see FIG. 2) upward from below and fastened thereto via an elastic back plate 36 and the like by a nut 37, whereby the cylinder 32 is mounted to the water tub 16. Meanwhile, the bottom plate 11a of the outer casing 11 is provided with a mounting plate 38 as shown in FIG. 2, and the shaft 33 has a lower end formed with a connecting portion 33a which is inserted through the mounting plate 38 downward from above and fastened thereto via an elastic back plate 39 and the like by a nut 40, whereby the shaft 33 is mounted to the bottom plate 11a of the outer casing 11.

Figure 3:
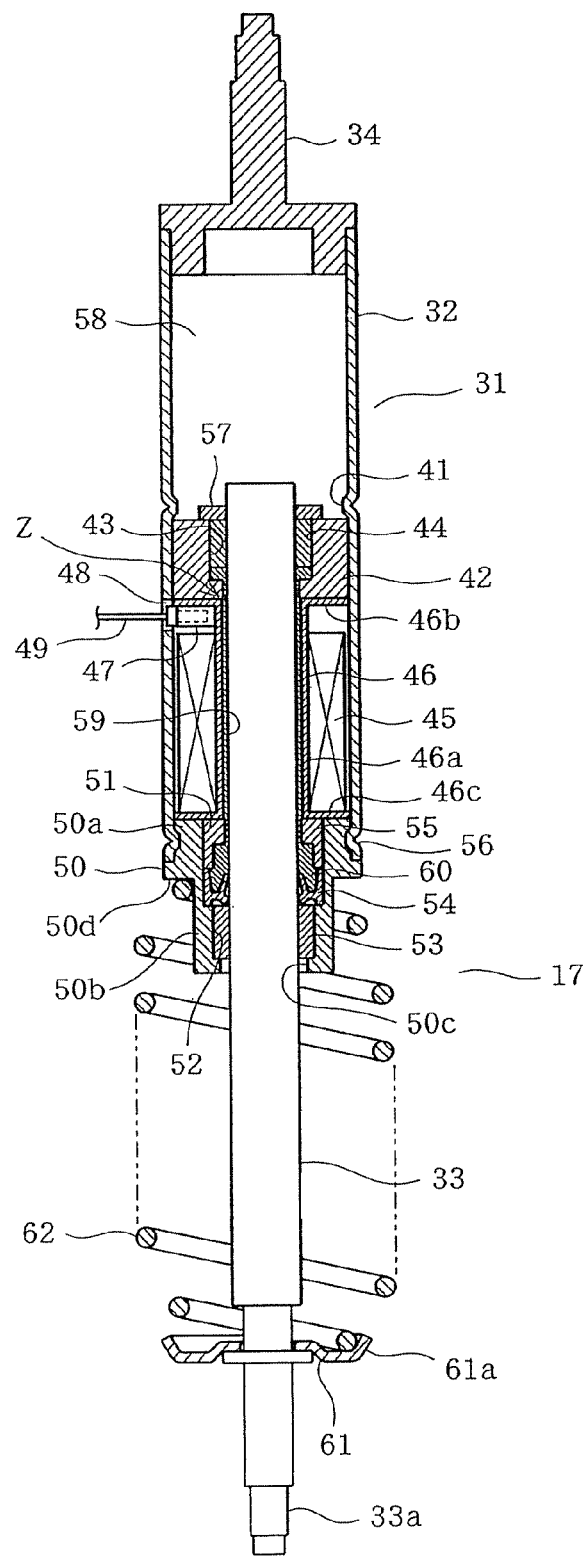
FIG. 3 is a sectional view of a vibration damping device.

The cylinder 32 has a middle inner circumferential wall formed with an annular protrusion 41 by means of external pressing as shown in FIG. 3. A yoke 42 is press fitted into the cylinder 32 so as to assume a position just beneath the annular protrusion 41. The yoke 42 is formed of a magnetic material into a short cylindrical shape and has a space 43 defined between an inner circumferential upper part and the shaft 33. A bearing 44 is accommodated in the space 43. The bearing 44 is formed into a short cylindrical shape and is smaller and shorter than the yoke 42. The bearing 44 is formed of an oil-impregnated sintered metal, for example.

A bobbin 46 on which a coil 45 is wound is press fitted into the cylinder 32 so as to be located beneath the yoke 42. The bobbin 46 includes a cylindrical main part 46a which has upper and lower ends formed with flanges 46b and 46c respectively. The coil 45 is wound on the main part 46a. A terminal block 47 independent of the bobbin 46 is mounted to the main part 46a of the bobbin 46 so as to be located beneath the upper flange 46b. The terminal block may be formed integrally with the main part 46a, instead. The terminal block 47 has a connecting terminal provided therein although the connecting terminal is not shown. Both beginning and termination of the coil 45 are connected to the connecting terminal. The cylinder 32 has a connecting hole 48 which is formed in the middle of the cylinder 32 so as to correspond to the terminal block 47. A lead 49 has a distal end inserted through the connecting hole 48 to be connected to the connecting terminal.

A holding member 50 is press fitted into the cylinder 32 so as to be located beneath the bobbin 46. The holding member includes an upper large-diameter part 50a and a lower small-diameter part 50b thereby to be formed into a stepped short cylindrical shape. The holding member 50 has a large-diameter space 51 defined between an inner periphery of the large-diameter part 50a and an inner periphery of an upper part of the small-diameter part 50b and the shaft 33. The holding member 50 also has a small-diameter space 52 defined between an inner periphery of a lower part of the small-diameter part 50b and the shaft 33. A bearing 53 formed of an oil-impregnated sintered metal, for example is press fitted into the small-diameter space 52. The holding member 50 housing and holding the bearing 53, the sealing member 54 and the yoke 55 is disposed beneath the bobbin 46 in the cylinder 32.

The sealing member 54 is formed into the shape of a lip, and the yoke 55 is formed of a magnetic material. Furthermore, after the holding member 50 has been press fitted into the cylinder 32, a peripheral part of the holding member 50 is swaged as shown at a swaged part 56 so that the holding member 50 is fixed to the cylinder 32. As a result, the yoke 42 (the bearing 44) and the coil 45 (the bobbin 46) are also held by the holding members 50 so as to be prevented from dropping out.

Before attachment of the connecting member 34 to the cylinder 32, the shaft 33 is inserted into the cylinder 32 from above through the bearing 44, the yoke 42, the bobbin 46 (the coil 45), the yoke 55, the sealing member 54 and the bearing 53 sequentially, being projected out of an opening 50c of the holding member 50 to be located below the holding member 50. In the projected state, the shaft 33 is axially reciprocable relative to the bearing 44, the yoke 42, the bobbin 46 (the coil 45), the yoke 55, the sealing member 54 and the bearing 53. A retaining ring 57 is secured to an upper end of the shaft 33. An upper interior of the cylinder 32 located above the upper end of the shaft 33 serves as a hollow cavity 58.

A magnetic viscous fluid 59 is injected into the cylinder 32 so as to fill a first gap between the shaft 33 and the bobbin 46 (the coil 45), a second gap between the shaft 33 and the yoke 42, located near the first gap and a third gap between the shaft 33 and the yoke 55. The magnetic viscous fluid 59 serving as a functional fluid 59 also fills an accumulating portion 60 defined between the yoke 55 and the sealing member 54. The fluid 59 is sealed by the sealing member 54 thereby to be prevented from leaking. A part of the suspension 17 enclosing the magnetic viscous fluid 59 will be referred to as "enclosing part Z."

The functional fluid functionally changes its rheological property such as viscosity by controlling a physical amount externally applied thereto. The functional fluid here includes a fluid that changes its viscosity when an electric energy is applied thereto. Although the magnetic viscous fluid (an MR fluid) 59 changing its viscous characteristic according to an intensity of magnetic field in the embodiment, another type of functional fluid may be employed, instead. The magnetic viscous fluid is made by dispersing ferromagnetic particle such as iron or carbonyl iron into oil, for example. The ferromagnetic particle forms a chain cluster when a magnetic field is applied thereto such that an apparent viscosity is increased.

A spring bearing member 61 having a spring seat 61a is attached to a lower part of the shaft 33 located below the holding member 50. A coil spring 62 is provided between the spring seat 61a of the spring bearing member 61 and a stepped portion 50d between the large-diameter portion 50a and the small-diameter portion 50b, so as to be coiled around the shaft 33. The stepped portion 50d of the holding member 50 functions as a holding portion receiving, as a spring seat, one end of the spring 62. The spring seat 61a functions as a holding portion receiving, as a spring seat, the other end (a lower end) of the spring 62. The suspension 17 is thus incorporated between the water tub 16 and the bottom plate 11a of the outer casing 11 to support the water tub 16 on the bottom plate 11a in a vibration proofing manner. The suspension 17 can be assembled in a unitized state by accommodating and holding the yoke 55, the sealing member 54 and the bearing 53 in the holding member 50.

Figures 4, 5:
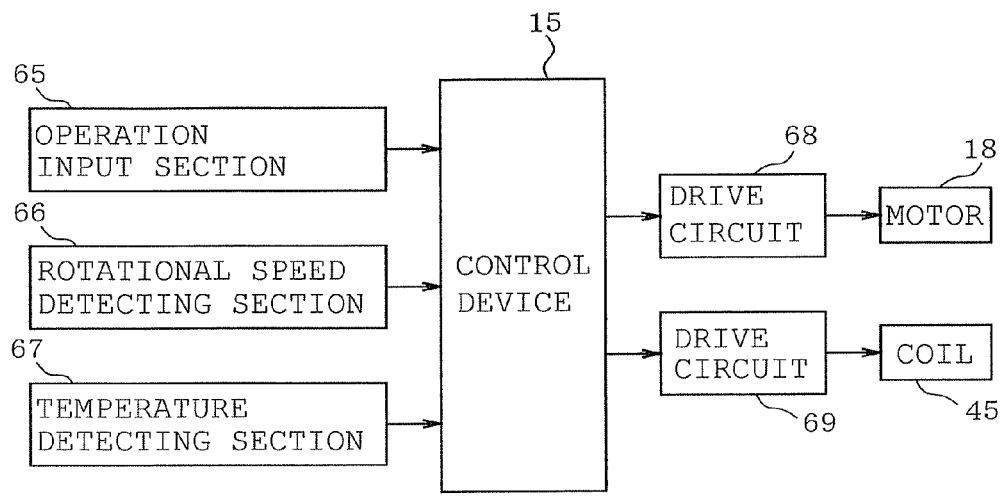
FIG. 4 is a block diagram showing an electrical arrangement of the control system.
FIG. 5 is a diagram showing the relationship between an amount of energization to a coil and a damping force of the vibration damping device.

FIG. 4 is a block diagram showing the configuration of control system of the above-described washing machine and in particular, a part relating to the control of the suspension 17. The control device 15 is mainly composed of a microcomputer and controls an entire operation of the washing machine 10 including wash, dehydration and drying steps in which laundry accommodated in the drum 20 is washed, dehydrated and dried respectively. To the control device 15 are connected an operation input section 65 into which various operation signals are supplied from key switches (none of which are shown) of the operation panel 14, a rotational speed detecting section (a rotation sensor) for detecting a rotational speed of the motor 18, and a temperature detecting section 67.

The temperature detecting section 67 includes a thermistor, for example and is mounted on the bottom plate 11a of the outer casing 11 to detect a temperature in the outer casing 11. The temperature detecting section 67 may be provided at a part of the washing machine other than the bottom plate 11a or may be provided so as to detect a temperature outside or around the washing machine. Furthermore, the control device 15 controls the motor 18 and the coil 45 via respective drive circuits 68 and 69 based on supplied signals and a stored control program. In this case, a rotational speed of the motor 18 is controlled by a pulse width modulation (PWM) system by means of an inverter.

The operation of the washing machine thus constructed will now be described. When an operation such as wash or dehydration is started on the basis of input signals supplied from the operation input section 65, the water tub 16 is vibrated mainly vertically with rotation of the drum 20 accommodating laundry. In response to the vertical vibration of the water tub 16, the cylinder 32 mounted to the water tub 16 is vertically vibrated around the shaft 33 while the spring 62 of the suspension 17 is being expanded and contracted. In this case, the cylinder 32 is vertically vibrated together with the components thereof (the yoke 42, the bearing 44, the bobbin 46, the coil 45, the holding member 50, the yoke 55, the sealing member 54 and the bearing 53). The magnetic viscous fluid 59 filling the enclosing part Z imparts to the damper 31 a damping force resulting from frictional resistance due to the fluidity thereof, damping a vibrational amplitude of the water tub 16.

In this case, when a magnetic field is generated by energization to the coil 45, the magnetic field is imparted to the magnetic viscous fluid 59, whereupon the viscosity of the magnetic viscous fluid 59 is increased. More specifically, when the coil 4 is energized, a magnetic circuit is established through the shaft 33, the magnetic viscous fluid 59, the yoke 42, the cylinder 32, the yoke 55, the magnetic viscous fluid 59 and the shaft 33, and the viscosity of the magnetic viscous fluid 59 of a part which magnetic flux passes is increased. In particular, the viscosity of magnetic viscous fluid 59 is increased to a large degree between the shaft 33 and the yoke 42 and between the yoke 55 and the shaft 33 since the magnetic flux density is high between the shaft 33 and the yoke 42 and between the yoke 55 and the shaft 33. As a result, the frictional resistance is increased to a large degree in the case where the cylinder 32 is vertically vibrated together with the components thereof, so that the damping force is increased.

FIG. 5 shows the relationship between an amount of energization to the coil 45 (current value) and the damping force of the suspension 17. As shown, when current I flowing into the coil 45 is sequentially increased from a non-energized state (designated by symbol "I0") to I5 (large current), the currents I0 to I5 have a relationship of $I0<I1<I2<I3<I4<I5$. The damping force F of the suspension 17 is increased in the sequence of F0 to F5 ($F0<F1<F2<F3<F4<F5$) according to amounts of current I0 to I5 respectively.

Figure 6:
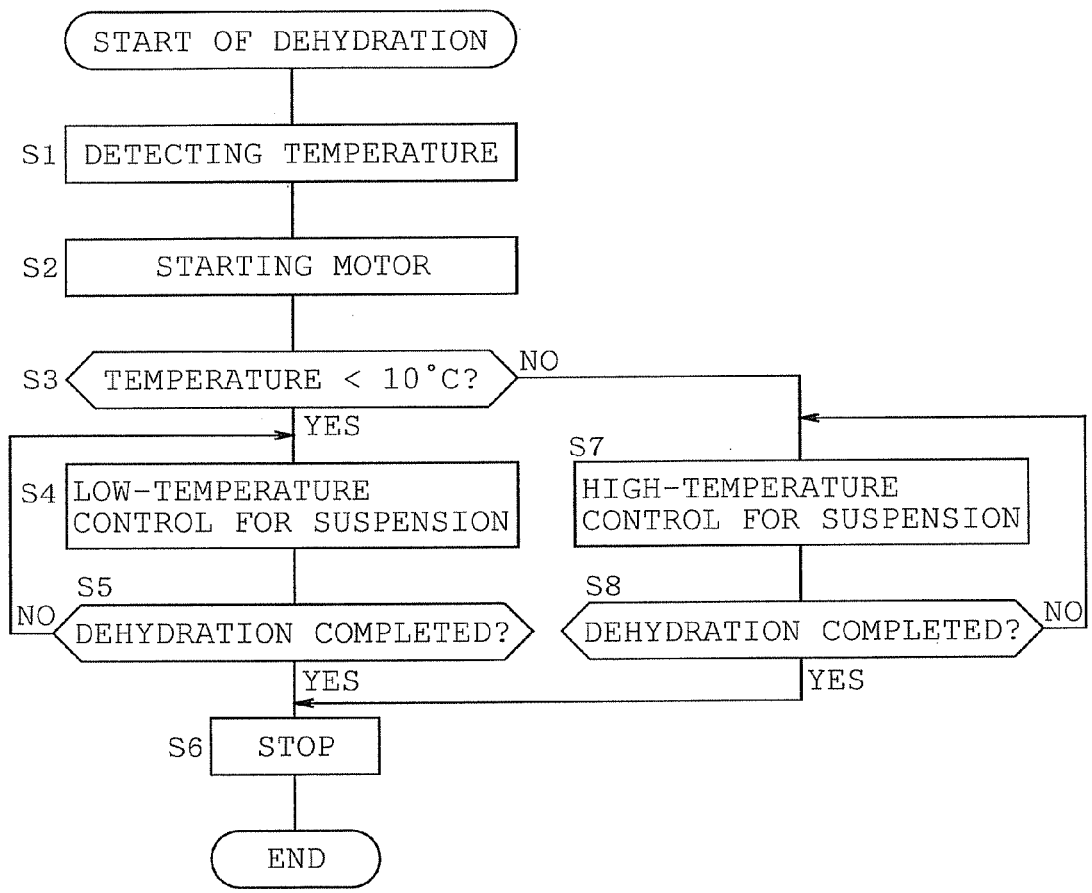
FIG. 6 is a flowchart showing control contents in a dehydration step.

The suspension 17 in the embodiment is configured to vary the damping force F based on a rotational speed of the motor 18 (a rotational speed of the drum 20) detected by the rotational speed detecting section 66 and a detection temperature detected by the temperature detecting section 67 in the dehydration step, thereby reducing vibration and noise as much as possible. Control of the suspension 17 will now be described with reference to FIGS. 1, 6, 7A and 7B. FIG. 6 shows control contents the control device 15 executes in the dehydration step based on the control program, and symbols S1 to S8 in FIG. 6 designate steps.

When the operation sequence reaches the dehydration step, the control device 15 detects a temperature in the outer casing 11 by the temperature detecting section 67 (step S1) as shown in FIG. 6. The control device 15 then starts up the motor 18 to rotate the drum 20 (step S2), increasing a rotational speed of the motor 18 (a rotational speed of the drum 20) to a steady rotational speed. In a rotational speed increasing stage, the control device 15 executes a low-temperature control for the suspension 17 when the temperature detected by the temperature detecting section 67 is lower than a predetermined temperature (10° C., for example) (YES at step S3). The control device 15 executes a high-temperature control for the suspension 17 when the detected temperature is equal to or higher than 10° C., for example (NO at step S3).

More specifically, the vibration of the water tub 16 is increased when resonating with the motor 18 in the rotational speed increasing stage, and in particular, in a low speed range (designated by "A1" in FIG. 1) in which a primary resonance occurs. Furthermore, since the vibration characteristics of the washing machine 10 change due to temperature dependencies of components (various materials including rubber) of the washing machine 10, a low temperature results in a reduction in the damping action of the entire washing machine 10. Hence, the control device 15 changes the current I in the sequence of I0, I5, I0, I3 and I1 with increase in the rotational speed of the motor 18 so that the current I corresponds to the primary resonance domains A1 and A2 (see FIGS. 1 and 7A), in the low temperature control at step S4, whereby the damping force is set to F0, F5, F0, F3 and F1. In other words, the control device 15 sets the current I to be relatively larger in the low temperature control, thereby rendering the damping force F of the suspension 17 relatively higher. Particularly in the primary resonance domain A1 (the low speed range), the control device 15 sets the current I to flow into the coil 45 to the large current I5 so that the damping force F of the suspension 17 is set to the damping force F5 that is higher than the damping force (F0 to F3) in the high speed range A3 higher than the speed range A1.

Figure 2:
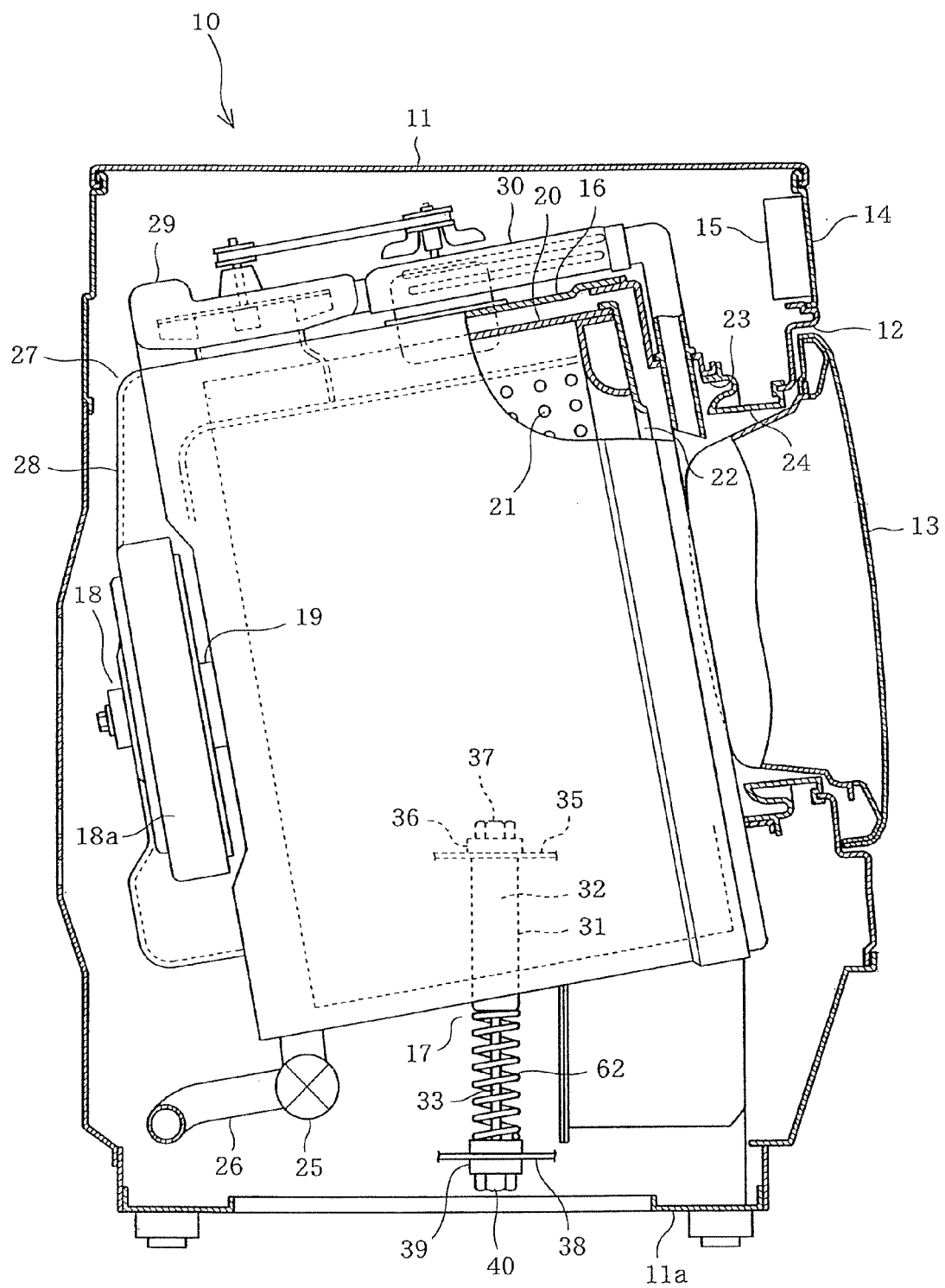
FIG. 2 is a longitudinal side section of the whole washing machine.

In the low temperature control, furthermore, the control device 15 maintains the small current I1 with the motor 18 being set to the steady rotational speed as shown in FIG. 1 and thereafter changes the current from the small current I1 to the current I2 and the middle current I4 in turn in a rotational speed reducing stage from the rotational speed reduction to the stop of the drum 2 so that the current I corresponds to the resonance domains A2 and A1 respectively. As a result, the damping force F in the rotational speed reducing stage is set to F2 in the secondary resonance domain A2 with reduction in the rotational speed and thereafter, the damping force F is set to F4 in the primary resonance domain A1, thus being varied step-by-step. Furthermore, when the damping force F is thus controlled in a stepwise manner, the number of on-off operations of the coil 45 in the dehydration step is reduced, whereupon the service life of the magnetic viscous fluid 59 can be improved. More specifically, the magnetic viscous fluid 59 tends to decline in function earlier as the frequency of subjection to the magnetic field is increased. Accordingly, since the execution of the above-described control reduces the frequency of on-off operation, the function of the suspension 17 can be maintained in a good state. Although the damping force F is varied in two stages in each resonance domain in the embodiment, the damping force may be varied in multiple stages (three or more stages), instead.

As described above, the control of the suspension 17 is carried out according to rotation of the drum 20 in a period between start and end of the dehydration step (see steps S4 to S6 in FIG. 6). On the other hand, in the high temperature control at step S7, the control device 15 renders the damping force F of the suspension 17 lower than in the low temperature control.

Figure 7A:
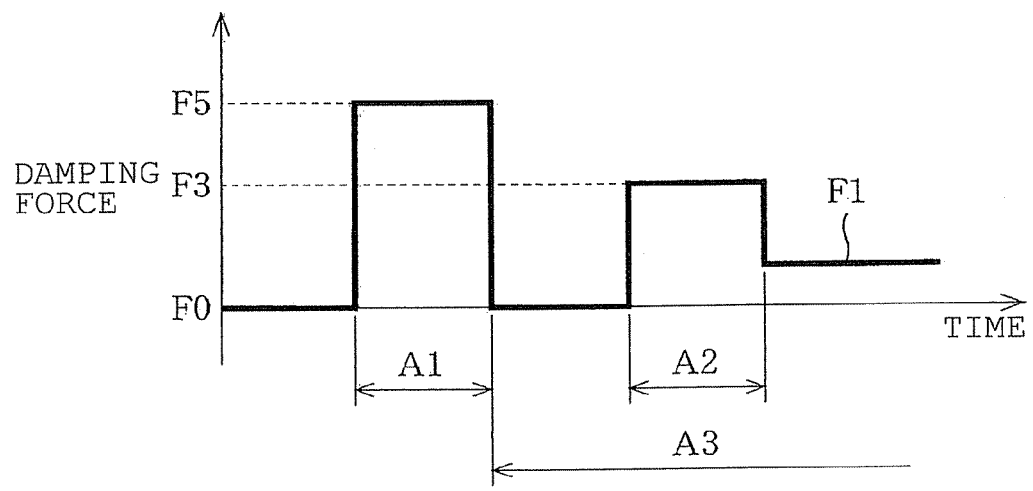
FIGS. 7A and 7B are views explaining low and high temperature control modes respectively.
Figure 7B:
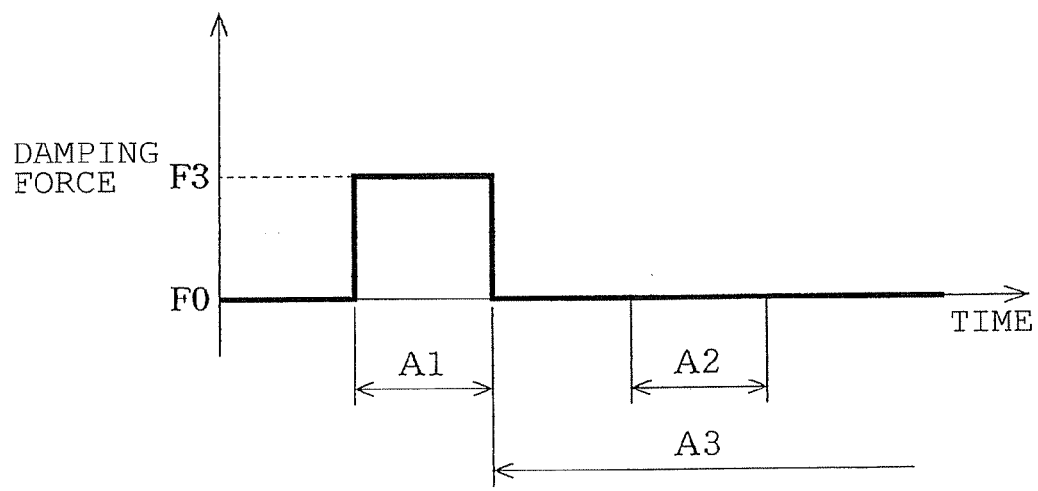

More specifically, FIG. 7B shows an example of manner of varying the damping force F in the rotational speed increasing stage carried out in the high temperature control. The current I supplied to the suspension 17 is set to I3 (a middle current) in the primary resonance domain A1 in the rotational speed increasing stage and thereafter to I0 (non-energized state) in the high speed range A3. Accordingly, as obvious from the comparison of FIGS. 7A and 7B, the damping force F of the suspension 17 is controlled so as to be relatively lower in the high temperature control. Thus, in the rotational speed reducing stage, the control device 15 maintains the coil 45 in the non-energized state with the motor 18 being rotated at the steady rotational speed and thereafter increases the current from the non-energized state so that the current corresponds to the resonance domains A2 and A1 in turn step-by-step, for example. In this case, the damping force F is set to be lower than in the low temperature control. Thus, when the high or low temperature control is carried out for the suspension 17 according to the detected temperature, a stable damping effect can be achieved regardless of an ambient temperature with respect to the washing machine 10. Furthermore, when the damping force of the suspension 17 is rendered variable corresponding to rotation of the drum 20 in the dehydration step and particularly in the resonance domain A1, the vibration and noise during occurrence of resonance are reduced as much as possible as a whole.

The resonance domain in the embodiment refers to a domain in the vicinity of the resonance point (resonant frequency) and including the resonance point. The primary resonance domain A1 refers to a resonance domain belonging to a relatively lower frequency range out of a plurality of resonance points of the washing machine 10.

In the embodiment as described above, the control device 15, the coil 45 and the drive circuit 69 serve as a control unit. The control unit changes the viscosity of the functional fluid according to rotation of the drum 20 in the dehydration step of the washing machine 10, thereby varying the damping force F of the suspension 17. Accordingly, differing from the conventional construction in which the damper is controlled on the basis of the vibration detected by the sensor, the suspension 17 of the embodiment increases the damping force F in the domain in the vicinity of the resonance point prior to the increase in the vibration due to resonance, for example. As a result, a vibration/noise suppression effect can be improved since occurrence of vibration is suppressed.

The functional fluid is formed of the magnetic viscous fluid 59 which changes its viscosity by application of electric energy thereto. Since the viscosity of the magnetic viscous fluid 59 can easily be changed by a simple configuration, the construction of the suspension 17 can be simplified and the responsibility of the suspension 17 can be improved. The coil 45 is employed as a control unit for the suspension 17 and accordingly, the damping force F of the suspension 17 can easily be controlled.

The control unit controls the suspension 17 so that the damping force F is rendered relatively higher in the low speed range Al in which the primary resonance occurs in the water tub 16 in the dehydration step and so that the damping force F is rendered relatively lower in the high speed range A3 higher than the low speed range A1. Accordingly, in the range in the vicinity of the resonance point, a sufficient damping action can be produced by the suspension 17 before the vibration of the washing machine 10 is increased, and furthermore, a suitable damping force is also obtained in the high speed range A3, whereupon occurrence of vibration and noise can be suppressed.

The control unit controls the suspension 17 so that the damping force F of the suspension 17 is varied in the stepwise manner in the period from the steady rotational speed of the drum 20 to stop thereof. Accordingly, occurrence of vibration and noise can be suppressed in the resonance domain even when the drum 20 is slowed down in the dehydration step, and changes in a physical amount applied to the functional fluid can be rendered smaller (the number of on-off operation of the coil 45 can be reduced in the foregoing embodiment), whereupon the service lives of the functional fluid and accordingly the suspension 17 can be improved, and the function of the suspension 17 can be maintained successfully.

The temperature detecting section 67 is provided for detecting the temperature inside or outside the outer casing 11. The control unit controls the suspension 17 so that the damping force of the suspension 17 is rendered relatively higher when the temperature detected by the temperature detecting section is lower than the predetermined temperature and so that the damping force F is rendered relatively lower when the detected temperature is equal to or higher than the predetermined temperature. Accordingly, the control unit can carry out a control manner coping with the changes in the vibration characteristics due to the temperature dependency of the components of the washing machine 10. Consequently, the suspension 17 can perform a desirable damping action regardless of changes in the temperature inside or outside the outer casing 11, and a vibration/noise suppression effect can be improved.

According to the above-described drum washing machine 10, the control unit changes the viscosity of the functional fluid according to rotation of the drum in the dehydration step of the washing machine 10, thereby varying the damping force of the damping device. Accordingly, differing from the conventional construction in which the damper is controlled on the basis of the vibration detected by the sensor, the damping device can improve the damping force F in the domain in the vicinity of the resonance point prior to increase in the vibration due to resonance, for example. As a result, a vibration/noise suppression effect can be improved since occurrence of vibration is suppressed.

Figure 8:
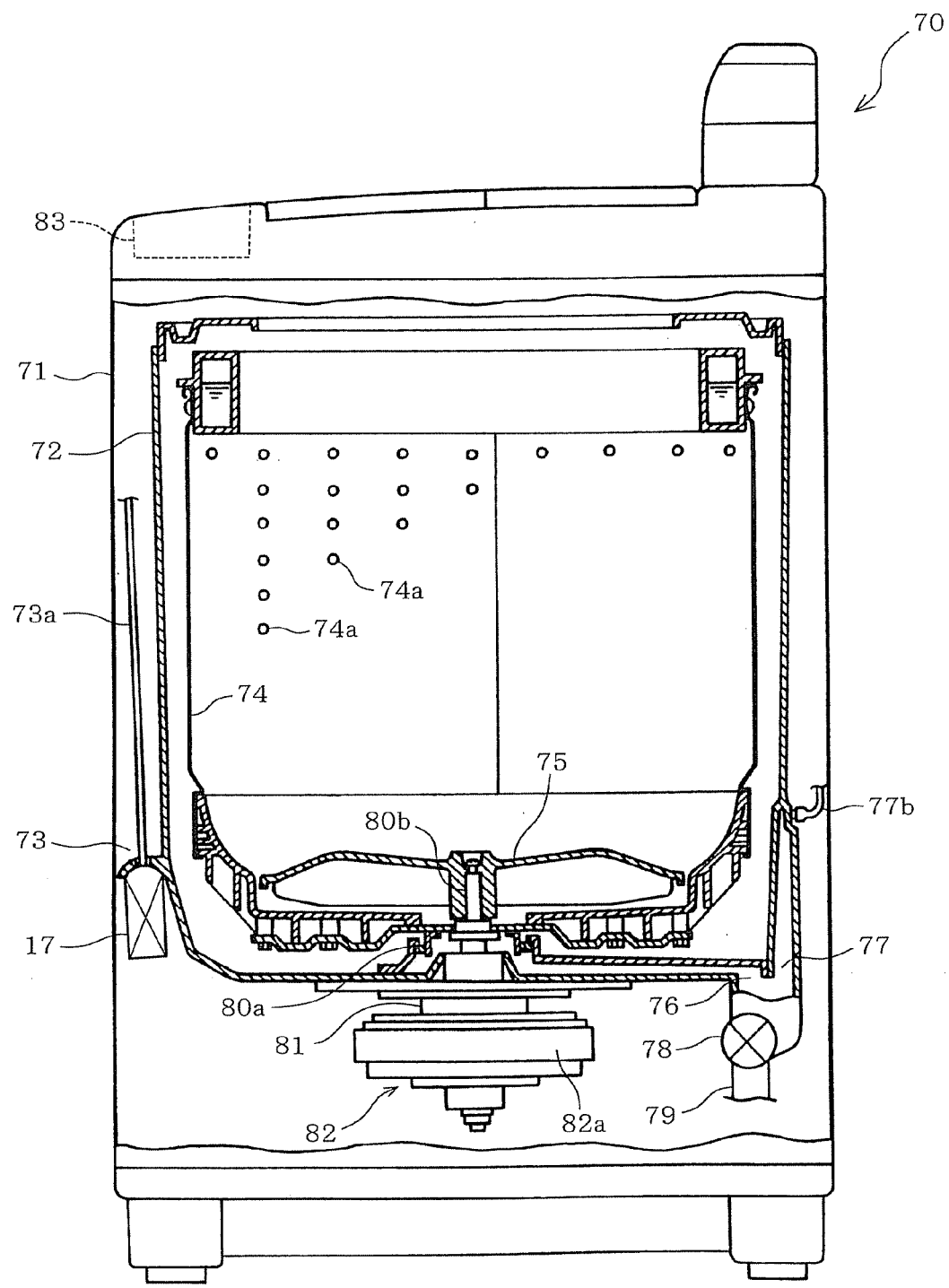
FIG. 8 is a longitudinal side section of a vertical axis type washing machine according to a second embodiment, the washing machine being provided with the vibration damping device.

FIG. 8 illustrates a second embodiment in which the suspension 17 is applied to a vertical axis type washing machine. Identical or similar parts in the second embodiment are labeled by the same reference symbols as those in the first embodiment and the description of these parts will be eliminated. Only the differences will be described as follows.

A vertical axis type full automatic washing machine (hereinafter, "a washing machine 70") serving as the vertical axis type washing machine includes a substantially rectangular box-shaped outer casing 71 serving as an outer shell. A water tub 72 is elastically supported in the outer casing 71 via a plurality of, for example, four elastic suspension mechanisms 73 only one of which is shown. A rotating tub 74 serving both as a wash tub and as a dehydration tub is provided in the water tub 72. An agitator 75 is provided on a bottom of the rotating tub 74. The rotating tub 74 has a peripheral wall through which a number of dehydration holes are formed. The water tub 72 has a bottom formed with a drain outlet 76 and an air trap 77. A drain valve 78 and a drain hose 79 are connected to the drain outlet 76 in turn. An air tube 77b is connected to the air trap 77 and has a distal end on which a water level sensor (not shown) is mounted.

A mechanical section 81 having a tub shaft 80a and an agitation shaft 80b is provided on an underside of the water tub 72. The rotating tub 74 is connected to the tub shaft 80a and the agitator 75 is connected to an upper end of the agitation shaft 80b. A washing machine motor 82 constituted by a brushless DC motor has a rotor 82a connected to a lower end of the agitation shaft 80b. In a wash step (and a rinse step) of the washing machine 70, rotation of the motor 82 is transmitted via the agitation shaft 80b only to agitator 70 in a wash step (and a rinse step) of the washing machine 70. In a dehydration step, the rotation of the motor 82 is transmitted via the tub shaft 80a and the agitation shaft 80b to the rotating tub 74 and to the agitator 75 respectively.

The four elastic suspension mechanisms 73 are mounted on an inner peripheral wall of the outer casing 71 at regular intervals so as to be located around the water tub 72. Each elastic suspension mechanism 73 includes a suspension rod 73a bridged between the outer casing 71 and the bottom of the water tub 72 and a suspension 17 mounted on an end of the suspension rod 73a located at the water tub 72 side. Furthermore, a control device 83 controlling an overall operation of the washing machine 70 is provided in the outer casing 71. To the control device 83 are connected the operation input section into which various operation signals are supplied, a rotational speed detecting section for detecting a rotational speed of the motor 82, and the temperature detecting section although none of them are shown.

The control device 83, the coil 45 and the drive circuit 69 serve as the control unit. The control unit changes the viscosity of the functional fluid according to rotation of the rotating tub 74 (rotation of the motor 82) in the dehydration step of the washing machine 70, thereby varying the damping force F of the suspension 17. Furthermore, the control device 83 controls the suspension 17 so that the damping force F of the suspension 17 is rendered relatively higher in the low speed range where the water tub 72 resonates with the motor 82 and so that the damping force F of the suspension 17 is rendered relatively lower in the high speed range higher than the aforementioned low speed range, in the same manner as in the first embodiment.

Furthermore, the control device 83 controls the suspension 17 so that the damping force F of the suspension 17 is varied in the stepwise manner in the period from the steady rotational speed of the rotating tub 74 to the stop thereof, in the same manner as in the first embodiment. The control device 83 further controls the suspension 17 so that the damping force F of the suspension 17 is rendered relatively higher when a detection temperature of the temperature detecting section 67 is lower than a predetermined temperature and so that the damping force F is rendered relatively lower when the detection temperature is equal to or higher than the predetermined temperature.

As described above, the suspension 17 can also perform a successful damping action in the vertical axis type washing machine 70 regardless of temperature changes in the outer casing 11, and a vibration/noise suppression effect can be improved.

Figure 9:
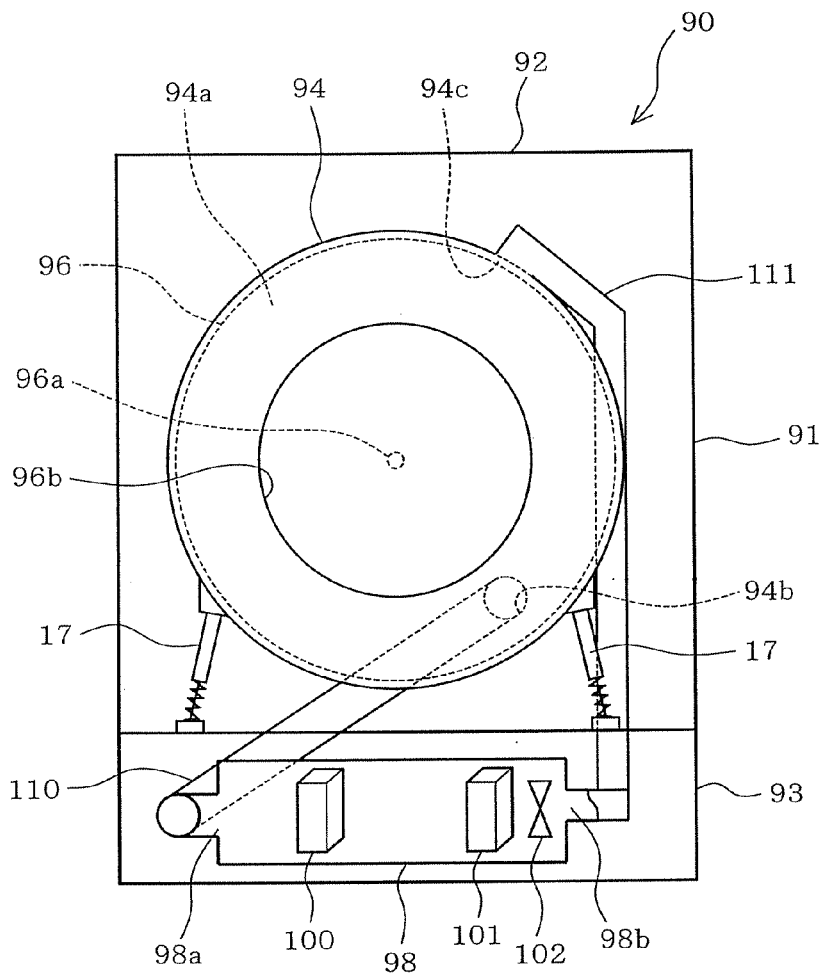
FIG. 9 is a schematic diagram showing a drying machine according to a third embodiment, the drying machine being provided with the vibration damping device.
Figure 10:
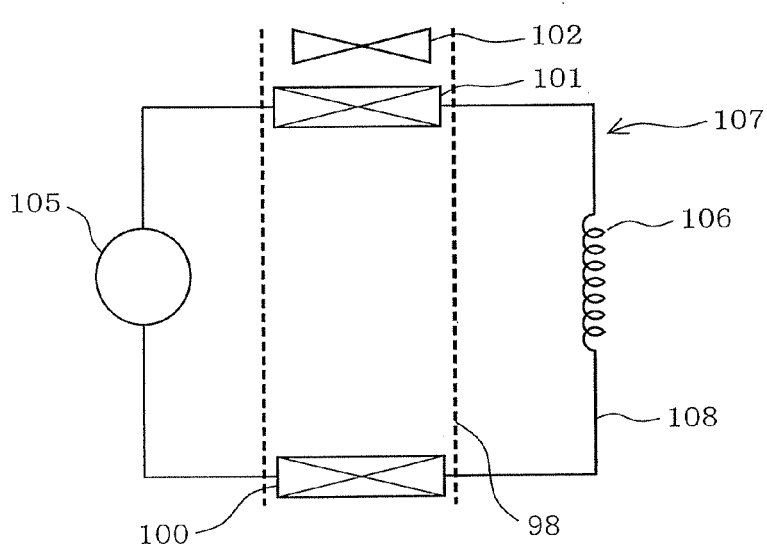
FIG. 10 is a schematic diagram explaining the configuration of a heat pump.

FIGS. 9 and 10 illustrate a third embodiment in which the suspension 17 is applied to a laundry drying machine (hereinafter, "drying machine 90"). Identical or similar parts in the third embodiment are labeled by the same reference symbols as those in the first and second embodiments and the description of these parts will be eliminated. Only the differences will be described as follows.

The drying machine 90 includes a substantially rectangular box-shaped outer casing 91 including a machine body 92 and an equipment chamber 93 provided under the machine body 92. The machine body 92 has an interior divided by a partition plate 94a into a cylindrical front chamber 94 and a rear chamber (not shown), for example. A cylindrical drum (rotating tub) 96 is mounted in the front chamber 94. The drum 96 has a rear to which a shaft 96a is fixed. The shaft 96a is rotatably supported on a bearing (not shown). A number of ventholes are formed through the rear of the drum 96 although not shown. A plurality of baffles is mounted in an interior of the drum 96.

The drum 96 has an opening 96b formed through a central front thereof and a number of ventholes (not shown) located around the opening 96b. Furthermore, the machine body 92 has a front formed with a through access opening and mounted with a door which opens and closes the access opening, although neither access opening nor door is shown. Clothes (laundry) are put into and taken out of the drum 96 through the access opening and the opening 96b.

An electric motor (not shown) is fixed in the front chamber 94 to rotate the drum 96 about the shaft 96a. A supported body in the embodiment is the front chamber 94, for example. The front chamber 94 is elastically supported by a pair of right and left suspensions 17 mounted on the bottom of the machine body 92.

A cylindrical air passageway 98 is disposed in the equipment chamber 93. The air passageway 98 has two ends serving as an inlet 98a and an outlet 98b respectively. An evaporator 100, a condenser 101 and a blower fan 102 are disposed sequentially from the inlet 98a side toward the outlet 98b side in the air passageway 98. The evaporator 100 and the condenser 101 constitute a heat pump 107 (a refrigeration cycle) together with a compressor 105 and a capillary tube 106 serving as a decompression unit, as shown in FIG. 10. The evaporator 100, the compressor 105, the condenser 101 and the capillary tube 106 are connected to one another by refrigerant circulation pipes 108 so that a refrigerant is circulated upon drive of the compressor 105.

An exhaust duct 110 is connected to the inlet 98a of the air passageway 98 as shown in FIG. 9. The exhaust duct 110 extends from the equipment chamber 93 through the bottom of the machine body 92 into the rear chamber to be connected to an outlet 94b formed through the partition plate 94a (that is, the rear side of the front chamber 94), for example. On the other hand, an air supply duct 111 is connected to the outlet 98b of the air passageway 98. The air supply duct 111 extends upward from the equipment chamber 93 through the bottom of the machine body 92 to be connected to an air inlet 94c formed through an upper part of the front chamber 94, for example.

In a drying step executed by the above-described construction, the blowing action of the blowing fan 102 causes air in the drum 96 to flow from the outlet 94b through the exhaust duct 110 into the air passageway 98 while the drum 96 is being rotated. The air thereafter returns through the air supply duct 111 and the air inlet 94c into the drum 96. The air is thereafter circulated repeatedly. On the other hand, upon drive of the compressor 105, high-temperature high-pressure refrigerant flows to the condenser 101, whereby heat exchange takes place between the refrigerant and air in the air passageway 98. As a result, the temperature of the refrigerant drops such that the refrigerant is condensed into a liquid phase. The refrigerant flows through the capillary tube 106, thereafter flowing into the evaporator 100. The refrigerant is decompressed when flowing through the capillary tube 106, thereby presenting a low-temperature low-pressure gas-liquid mixing state. Furthermore, the air that has been heat-exchanged at the condenser 101 thereby to be heated up flows through the air supply duct 111 into the drum 96. Heat exchange takes place between the refrigerant flowing into the evaporator 100 and the air in the air passageway 98. As a result, high-temperature high-pressure having flowed through the exhaust duct 110 into the air passageway 98 is cooled. Furthermore, the refrigerant having passed through the evaporator 100 returns to the compressor 105 with its temperature having been raised. The air is thus circulated between the air passageway 98 and the drum so that wet clothes (laundry put into the drum after dehydration) in the drum 96 are dried.

The above-described drying machine 90 is provided with a control device (not shown) controlling an overall operation thereof. To the control device are connected an operation input section into which various operation signals are supplied, a rotational speed detecting section for detecting a rotational speed of the motor, a temperature detecting section and the like in the same manner as in the first embodiment, although none of them are shown.

The control device, the coil 45 and the drive circuit 69 constitute a control unit in the third embodiment. The control unit is configured to change the viscosity of the functional fluid according to rotation of the drum 96 (rotation of the motor) in the drying step thereby to vary the damping force F of the suspension 17. This control is carried out for the purpose of relaxing a shock of the fall of the clothes with rotation of the drum 96 or for another purpose. Furthermore, when a detection temperature detected by the temperature detecting section is lower than a predetermined temperature, the control device controls the suspension 17 so that the damping force F becomes relatively higher. When the detection temperature is equal to or higher than the predetermined temperature, the control device controls the suspension 17 so that the damping force F becomes relatively lower.

As described above, in the drying step carried out by the drying machine 90 of the third embodiment, too, the suspension 17 can perform a successful damping action regardless of temperature changes inside or outside the drying machine body 92, and a vibration/noise suppression effect can be improved. More specifically, in the drying machine 90 which has no washing function and no dehydration step, a better damping action can be achieved by varying the damping force F of the suspension 17 on the basis of rotation of the drum 96 and the detection temperature.

In a modified form, for example, the above-described temperature at which the control manner is changed between the high and low temperature controls may be set to a predetermined temperature lower than the above-mentioned 10.degree. C. according to the temperature dependency of the material (the vibration characteristic of the washing machine). Furthermore, the supported body should not be limited to the cylindrical front chamber 94 in the third embodiment. The suspension 17 may only be disposed so as to dampen the vibration produced with rotation of the drum 96.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A washing machine comprising:
an outer casing;
a tub mounted in the outer casing;
a rotating tub rotatably mounted in the tub;
a vibration damping device provided in the outer casing for damping vibration of the tub using a cylinder enclosing a magnetic viscous fluid which changes a viscosity when an electric energy is applied thereto,
the vibration damping device including:
the cylinder;
a shaft inserted into the cylinder;
a coil disposed in a the cylinder and extending the shaft
two yokes disposed between the cylinder and the shaft located at both axial sides of the coil in the cylinder respectively, the yokes forming a magnetic circuit together with the shaft and the cylinder, the shaft and the coil defining a first gap, one of the yokes and the shaft defining a second gap, the other yoke and the shaft defining a third gap, all the gaps being filled with the magnetic viscous fluid;
a sealing member disposed axially outside one of the yokes in the cylinder to seal the magnetic viscous fluid to prevent leaking of the magnetic viscous fluid; and
two bearings located axially outside the respective yokes in the cylinder to support the shaft so that the shaft is axially reciprocable relative to the yokes, the bearings, and the sealing member; and
a control unit configured to execute an energizing control of the coil to change the viscosity of the magnetic viscous fluid according to rotation of the rotating tub in a dehydration step, thereby varying a damping force of the vibration damping device.

2. The washing machine according to claim 1, wherein the control unit is configured to control the viscosity of the magnetic viscous fluid so that the damping force of the vibration damping device is rendered relatively higher in a low speed range in which the tub causes a primary resonance during the dehydration step and so that the damping force of the vibration damping device is rendered relatively lower in a high speed range which is higher than the low speed range.

3. The washing machine according to claim 1, wherein the control unit is configured to control the viscosity of the magnetic viscous fluid so that the damping force of the vibration damping device is rendered relatively higher in a low speed range in which the tub causes a primary resonance during the dehydration step and so that the damping force of the vibration damping device is rendered relatively lower in a high speed range which is higher than the low speed range.

4. The washing machine according to claim 1, wherein the control unit is configured to control the viscosity of the magnetic viscous fluid so that the damping force of the vibration damping device is stepwise varied during a period from a steady rotational speed of the rotating tub to rotation stop of the rotating tub.

5. The washing machine according to claim 1, further comprising a temperature detection unit which detects a temperature inside or outside the outer casing, wherein the control unit is configured to control the viscosity of the magnetic viscous fluid so that the damping force of the vibration damping device is rendered relatively higher when a detection temperature obtained by the temperature detection unit is lower than a predetermined temperature and so that the damping force of the vibration damping device is rendered relatively lower when the detection temperature obtained by the temperature detection unit is equal to or higher than the predetermined temperature.

* * * * *